United States Patent
Zhu et al.

(10) Patent No.: US 6,212,794 B1
(45) Date of Patent: Apr. 10, 2001

(54) GASEOUS FLUIDIZATION AIDS

(75) Inventors: Jingxu Zhu, London; John R. Grace, Vancouver, both of (CA); Shi-Yun Jiao, Kunming (CN)

(73) Assignee: The University of Western Ontario, London (CA)

(*) Notice: Subject to any disclaimer, the term of this patent is extended or adjusted under 35 U.S.C. 154(b) by 0 days.

(21) Appl. No.: 09/133,215

(22) Filed: Aug. 13, 1998

(51) Int. Cl.$^7$ ..................................................... F26B 17/00
(52) U.S. Cl. ........................................................... 34/576
(58) Field of Search .............................. 34/576, 359, 516, 34/517

(56) References Cited

U.S. PATENT DOCUMENTS 3,639,103 * 2/1972 Sheely ...................................... 23/288
4,585,673    4/1986  Sigai .
4,710,674   12/1987  Sigai .
4,825,124    4/1989  Sigai .
5,258,201   11/1993  Munn et al. .
5,277,245    1/1994  Dutta et al. .
5,439,867 *  8/1995  Khare et al. ........................ 502/407
5,783,721    7/1998  Tsumura et al. .

* cited by examiner

*Primary Examiner*—Henry Bennett
*Assistant Examiner*—Malik N. Drake
(74) *Attorney, Agent, or Firm*—R. Craig Armstrong

(57) ABSTRACT

A method of assisting with fluidization of difficult-to-fluidize materials and to improve the quality of fluidization of particles in general. The use of either helium or hydrogen as a gaseous fluidization aid. The addition of hydrogen and/or helium to the fluidization agent or the substitution of part of the fluidizing gas by hydrogen or helium as a fluidization agent is disclosed. The advantageous and desirable effect is that the fluidization quality of the particles is significantly improved.

40 Claims, 5 Drawing Sheets

Bed expansion ratio vs. normalized gas velocity for 4 μm glass beads

Bed expansion ratio vs. normalized gas velocity for 4 μm glass beads

Bed expansion ratio vs normalized gas velocity for 4 μm glass beads with different air-helium mixtures (R=air/helium ratio)

Bed expansion ratio vs. normalized superficial gas velocity for 4.5 μm lactose powder (with vibration)

FIG. 4

Normalized bed pressure drop vs. normalized superficial gas velocity for 4.5 μm lactose powder (without vibration)

- 4.5 micron lactose
- ●— (Increasing flow)
- -○- (Decreasing flow)
- ■— H2 (Increasing flow)
- -□- H2 (Decreasing flow)

without vibration

Normalized bed pressure drop vs. normalized superficial gas velocity for 4.5 μm lactose powder (with vibration)

GASEOUS FLUIDIZATION AIDS

BACKGROUND OF THE INVENTION

1. Field of the Invention

This invention relates to fluidization aids.

2. Description of the Prior Art

Gas-solids fluidization is a process where gas flows upwards through a bed of solid particles at a sufficient velocity that the particles begin to move and form a gas-solids suspension with properties like a liquid (hence the term "fluidized"). The advantages of these liquid-like properties are then employed to handle the particles and to carry out gas-solids chemical reactions, gas-phase solid-catalyzed chemical reactions or physical operations such as drying or coating. Traditionally, only particles larger than approximately 30–40 $\mu$m in diameter can be well fluidized. Finer and/or lighter particles, known as Geldart Group C or cohesive particles, are very difficult to fluidize. Most Group C particles are smaller than 30 $\mu$m, but there are exceptions.

The reason for the difficulties in fluidizing Group C fine powders is that there are relatively large inter-particle forces between fine particles, which reach or exceed the magnitude of the weight-minus-bouyancy force which must be overcome to fluidize the particles. Various methods have been applied to aid the fluidization of fine particles. Those methods include applying vibration, acoustic (including ultrasonic) waves, mechanical stirring, electromagnetic forces, or the addition of a particulate "fluidization aid" such as silica or anti-static agents to help to overcome the inter-particle forces.

The existing methods have several drawbacks. Firstly, the existing methods are not always effective. They tend to be more effective for certain fine powders than for others. In general, if the inter-particle forces are too strong, the aids are simply insufficient to overcome them. In addition, none of the existing methods work for extremely fine and cohesive powders, e.g. for most particles smaller than approximately 10 $\mu$m in diameter. Secondly, they require extra components, such as vibrators, acoustic field generators, motors, etc., to generate the external aids. Thirdly, they require additional energy to provide the external aids, or they require addition of foreign particles which may contaminate the product.

To obtain better fluidization, it is known to use fluidization aids, in addition to the fluidizing gas. Such aids include the addition of other powders such as antistatic aids or hydrophobic silica, mechanical means such as stirring, agitation or vibration of the bed, acoustic (including ultrasonic) waves, electromagnetic forces, etc. These aids help to overcome the inter-particle forces and produce better fluidization than is possible with the fluidizing gas alone.

In the prior art, such as in U.S. Pat. No. 3,639,103 (Sheely) for example, inert gases including helium have been used as fluidizing gases, so that they would not participate in a chemical reaction. However, the prior art teaches that, particularly when it comes to fine powders, fluidization aids are required regardless of what the fluidizing gas is.

U.S. Pat. No. 5,277,245 (Dutta et al.) uses a fluidizing gas comprising helium, hydrogen and mixtures thereof, optionally in combination with other fluidizing gases, to enhance the heat transfer characteristics of fluidized beds of Geldart type C powders. However, Dutta et al. blends the powder with a fine particle size hydrophobic silica, which functions as a fluidization aid.

U.S. Pat. No. 5,258,201 (Munn et al.) discloses a method for forming a protective coating on phosphor particles used in the manufacture of fluorescent lamps. One step in the process comprises the suspension of phosphor particles in a fluid zed bed. An inert gas, helium being one example, is passed upwardly through the fluidized bed. However, for fluidizing fine particles, a small amount of a fluidization aid is mixed with the phosphor powder, or it is stated that "fluidization of fine phosphor powders can alternatively be accomplished by additional agitation of the phosphor powder particles . . . ".

Three other U.S. Pat. Nos. 4,585,673; 4,710,674 and 4,825,124 (all Sigai), are very similar, and also contain similar statements regarding the need to add fluidization aids when fluidizing fine powders.

U.S. Pat. No. 5,783,721 (Tsumura et al.) relates to a process for the preparation of alkylhalosilanes by reacting fluidized particles of metallic silicon powder with a gaseous alkyl halide in the presence of a copper catalyst (also in the form of fluidized particles) in a fluidized bed reactor. Difficulties in fluidizing Geldart type C powders are discussed. These difficulties are overcome by carefully controlling the size distribution of the particles to ensure that there are sufficient larger-sized particles to act as fluidization aids for the smaller particles. The fluidizing gas is an inert gas, preferably nitrogen, although it is stated that helium or argon could be used.

Note that there is an important distinction between fluidizing gases and fluidization aids. In fluidized beds, the gas which is flowed through the bed of powder and is primarily intended to lift or expand the bed of powder, is the fluidizing gas. Helium in particular has been used as a fluidizing gas, selected for its inert nature or for its high thermal conductivity, but helium has not been previously recognized as a fluidization aid.

SUMMARY OF THE INVENTION

It is an object of the invention to overcome some of the drawbacks of the existing methods.

Another object of the invention is to provide a new method of assisting with fluidization of difficult-to-fluidize materials and to improve the quality of fluidization of particles in general.

Therefore, according to the invention, there is provided the use of either helium or hydrogen as a gaseous fluidization aid. The invention is the addition of hydrogen and/or helium to the fluidization agent or the substitution of part of the fluidizing gas by hydrogen or helium. The advantageous and desirable effect is that the fluidization quality of the particles is significantly improved. Another advantage is that these gases work very effectively for fine and cohesive particles. Moreover, these gases are readily available and inexpensive to incorporate into pre-existing fluidization processes.

Further features of the invention will be described or will become apparent in the course of the following detailed description.

BRIEF DESCRIPTION OF THE DRAWINGS

In order that the invention may be more clearly understood, the preferred embodiment thereof will now be described in detail by way of example, with reference to the accompanying drawings, in which.

DETAILED DESCRIPTION OF THE PREFERRED EMBODIMENT

Figure 1:
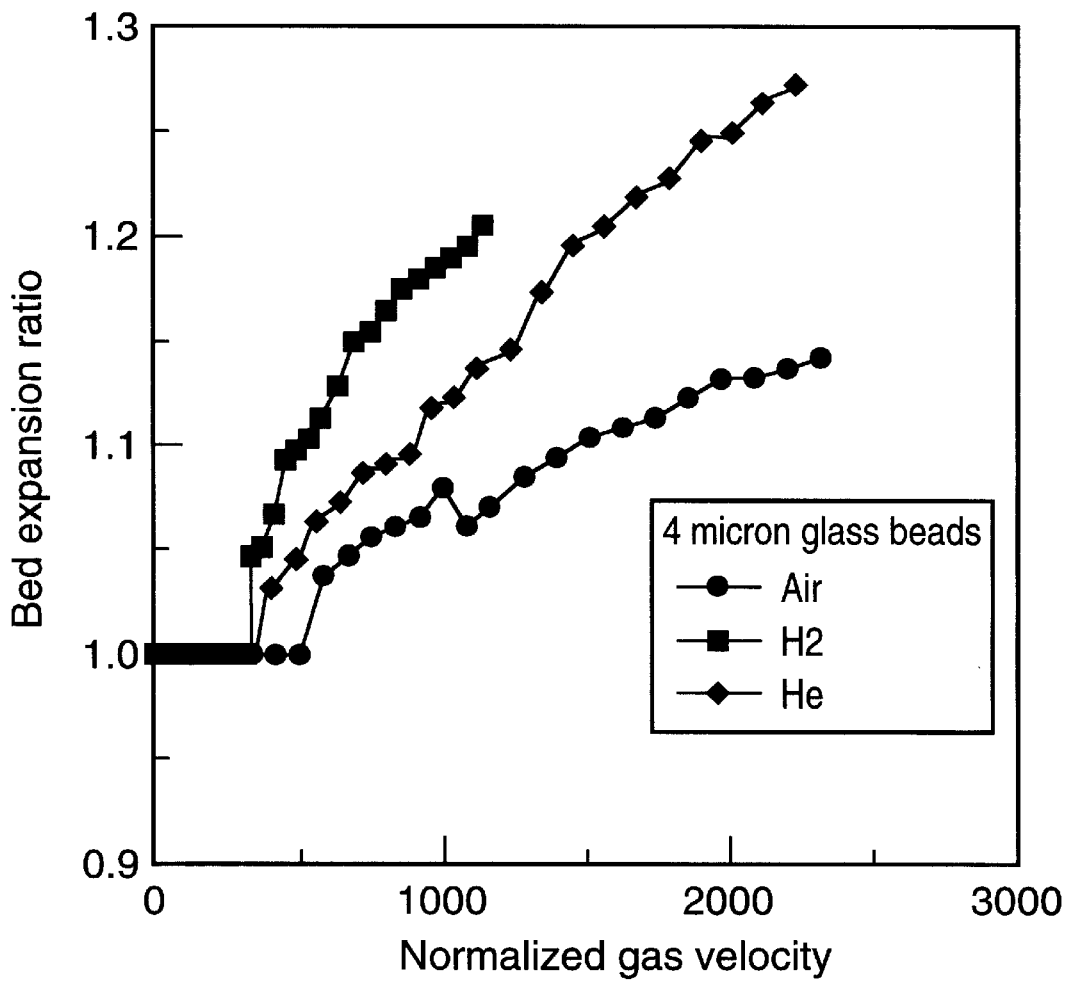
FIG. 1 is a graphical illustration of bed expansion when helium and hydrogen are used as the fluidizing gas, as compared to air for glass beads of mean diameter of 4 $\mu$m.
Figure 2:
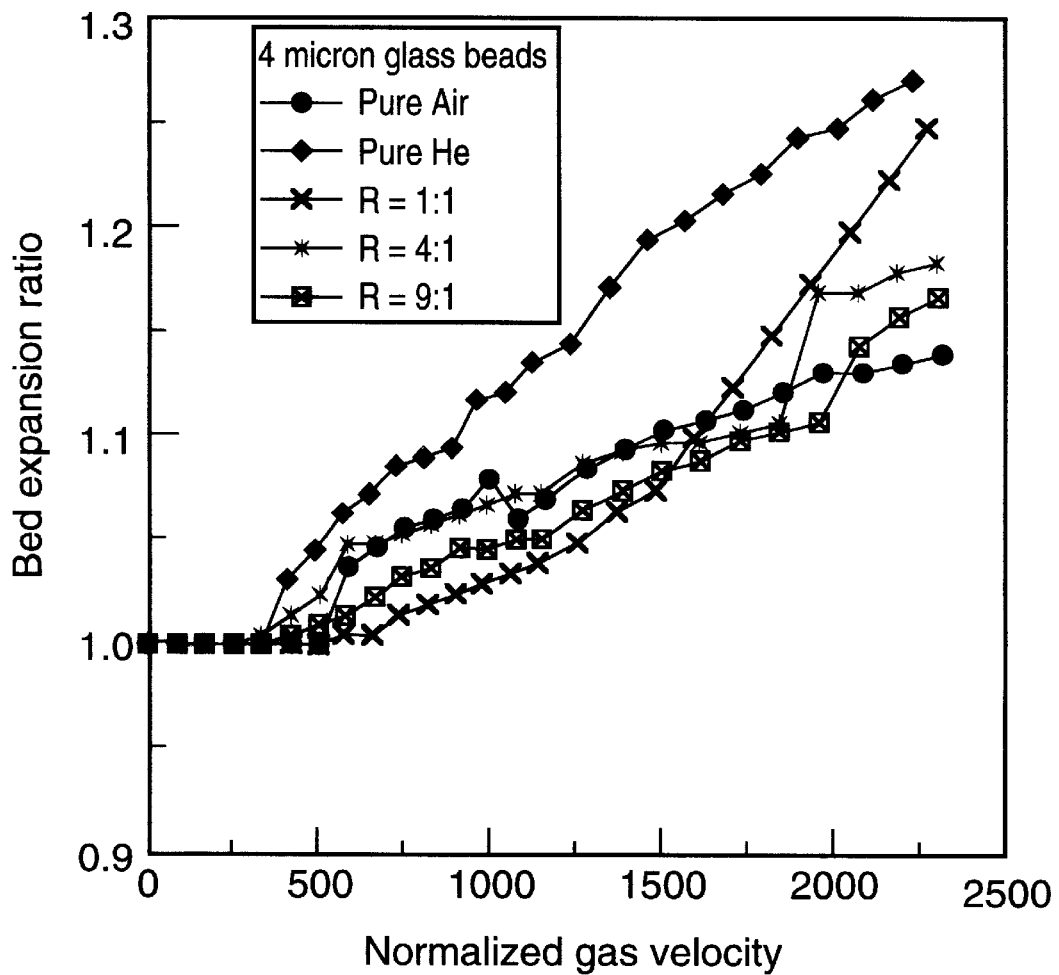
FIG. 2 is a graphical illustration of the bed expansion ratio (a measure of fluidization quality) with the introduction of varying quantities of helium in the fluidizing gas for glass bead of mean diameter of 4 μm (R is the air to helium molar ratio)
Figure 3:
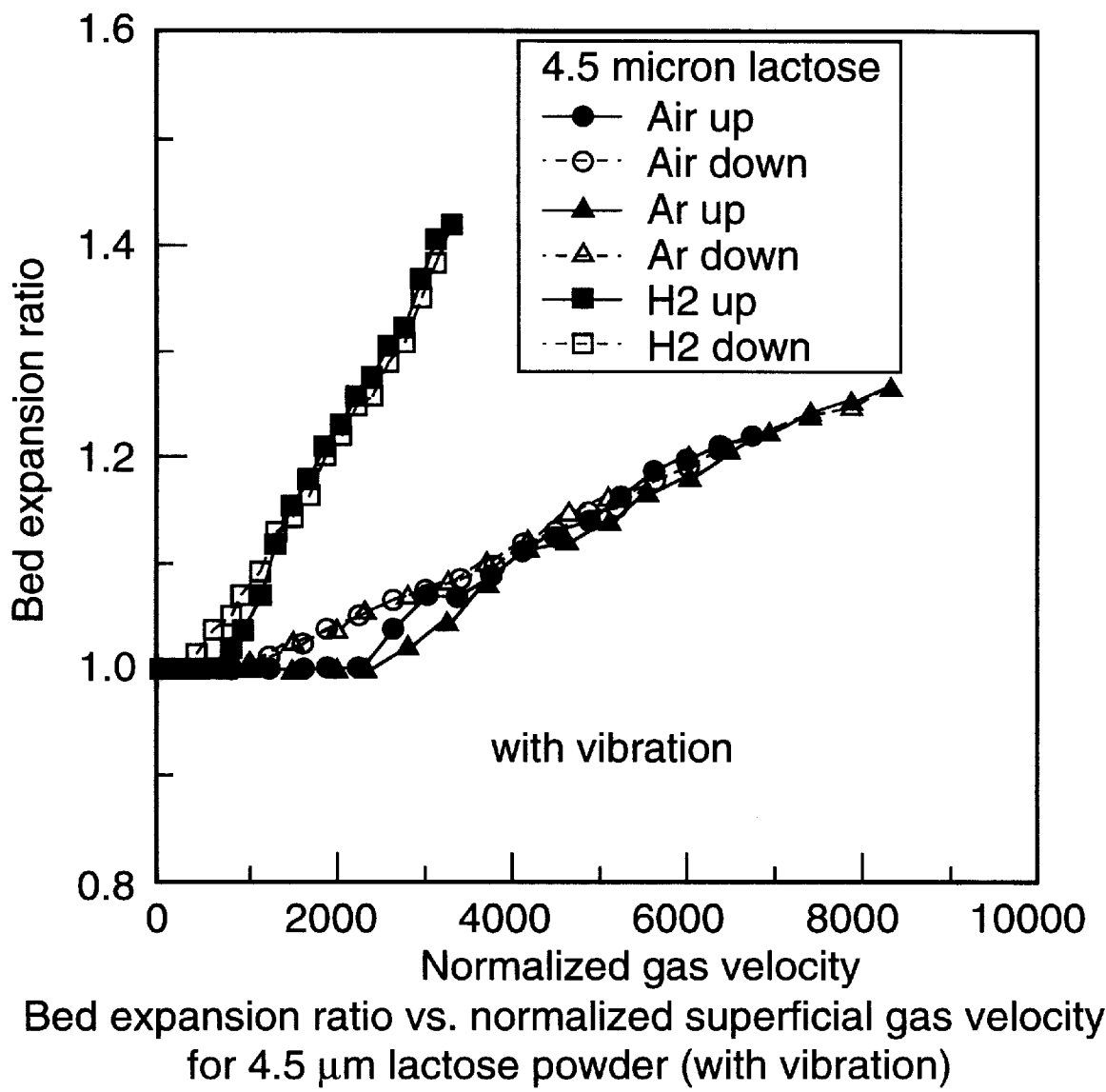
FIG. 3 is a graphical illustration of the bed expansion ratio with the introduction of hydrogen in a very cohesive lactose powder; and, FIGS. 4 and 5 are graphical illustrations showing the favourable effect of hydrogen on the pressure drop for cohesive lactose powder, as compared to air.

As illustrated in FIGS. 1–5, the invention lies in the use of either helium or hydrogen as a special gaseous fluidization aid. Pure hydrogen or helium or a combination of one or both of these gases with other gases may be used as the fluidizing agent, the fluidization quality of the very fine powders is significantly improved. FIG. 1 illustrates that the bed expansion is much higher when helium is used as the fluidizing gas, as compared to air alone with respect to 4 μm glass beads. Similarly, FIG. 2 illustrates that fluidization quality can be improved with only a portion of helium in the fluidizing gas with respect to the same size glass beads. The enhancement of fluidizing quality becomes much more predominant as the fluidization velocity increases. FIG. 3 illustrates the dramatic effect of hydrogen on the fluidization quality with respect to 4.5 μm lactose (very cohesive) powder with a constant vibration level. In all Figures, the normalized gas velocity in the abscissa is the superficial gas velocity divided by the calculated minimum fluidization velocity.

For processes where any gas species can be used, pure hydrogen or helium can be used to fluidize the fine particles, or one or both may be introduced as a constituent of the fluidizing gas. For processes where a certain type of gas is involved in the chemical reaction(s), a portion of helium or hydrogen can be added to the gas stream to enhance the fluidization quality. However, hydrogen may not be possible for safety or unwanted reaction reasons. On the other hand, helium is an inert gas and therefore, its use will often be preferable. The novelty is the introduction of these two low-molecular weight gases to assist in improving the quality of fluidization. These two gases have the lowest possible molecular weight.

Figure 5:
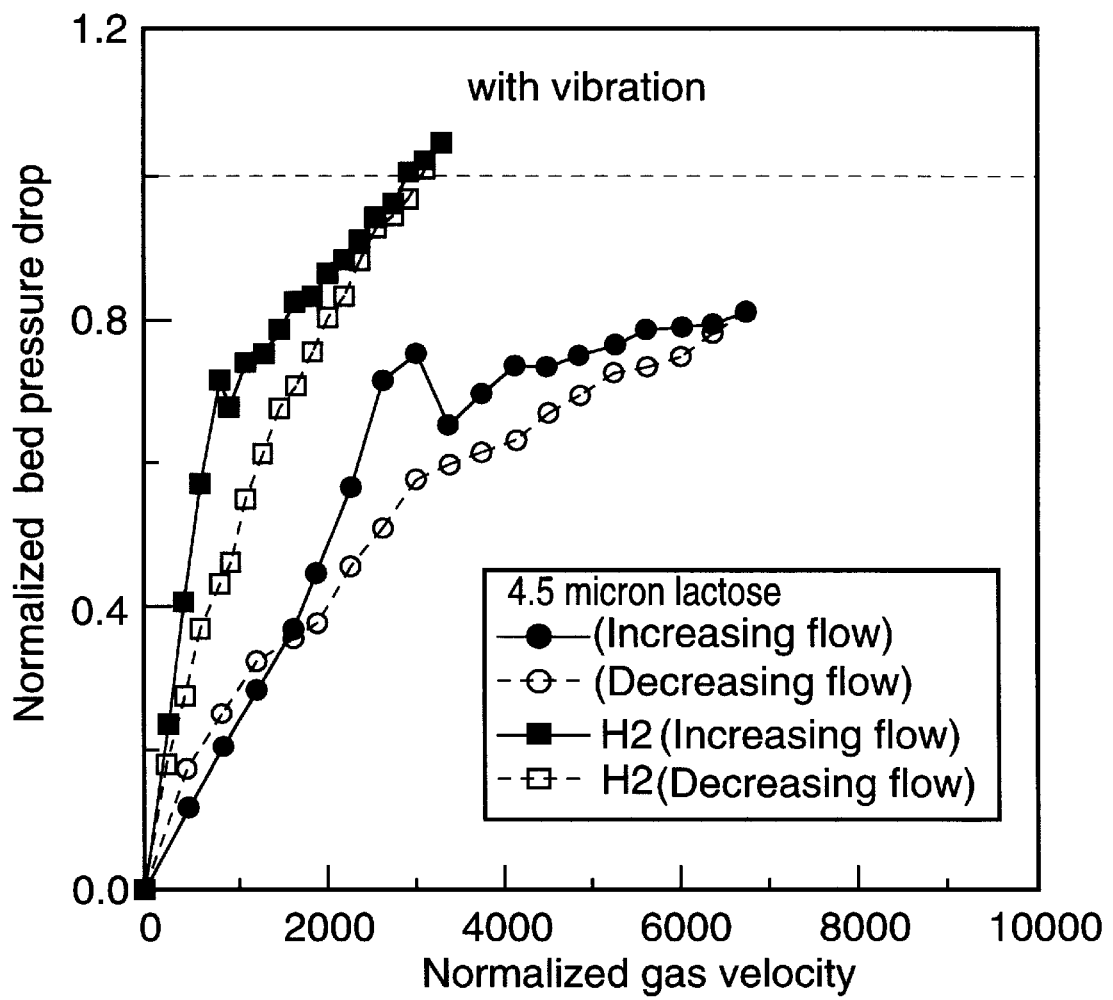

As FIGS. 4 and 5 illustrate, the use of hydrogen as a fluidization aid causes an increase in the pressure drop across the fluidized bed, so that the weight-minus-buoyancy is more nearly or completely balanced by the drag provided by the gas, indicating better fluidization qualities.

The application of using low-molecular-weight gas species as fluidization aids to fine powder fluidization can be applied to many existing chemical reaction and powder handling processes where fine and/or cohesive particles are used to improve the fluidization quality, and hence to improve the conversion and/or selectivity, as well as particles handling. In addition, the availability of this new technology may well also allow some other processes currently not employing a fluidized bed to be processed in a fluidized bed, thereby making use of their significant advantages over other types of gas-solids contactors, i.e. rotating drums, pneumatic conveying.

This invention may be applied to many processes where the handling of fine particles are involved. There are numerous fine powder processes in various industries, including the chemical, materials, manufacturing, food, nuclear, pharmaceuticals, and ceramics industries.

It will be appreciated that the above description relates to the preferred embodiment by way of example only. Many variations on the invention will be obvious to those knowledgeable in the field, and such obvious variations are within the scope of the invention as described and claimed, whether or not expressly described.

For example, hydrogen and/or helium may be added as a component of the total gas initially in order to assist in fluidizing a particulate material, and then the hydrogen or helium may be turned off once self-sustaining fluidization has been achieved.

Alternatively, hydrogen or helium may be added above a gas distributor into regions where defluidization is occurring locally to assist in effecting fluidization in those zones.

Further alternatively, addition of helium of hydrogen may be periodic or only carried out when some indicator of fluidization quality (e.g. pressure drop) indicates that defluidization is occuring or likely to occur.

As an alternative to hydrogen, deuterium or tritium may be used as it too has favourable low molecular weight.

What is claimed as the invention is:

1. A method of fluidizing powders, comprising using a fluidizing gas including other than one or more gases selected from the group consisting of hydrogen, deuterium, tritium and helium, and adding a low-molecular-weight gas to the fluidizing gas as a fluidization aid, where said low-molecular-weight gas is selected from the group consisting of hydrogen, deuterium, tritium and helium.

2. The invention according to claim 1, wherein said powders include fine particles comprising Geldart Group C particles.

3. The invention according to claim 1, wherein said powders consist essentially of Geldart Group C particles.

4. The invention according to claim 1, where there are no fluidization aids other than said low-molecular-weight gas.

5. The invention according to claim 2, where there are no fluidization aids other than said low-molecular-weight gas.

6. The invention according to claim 3, where there are no fluidization aids other than said low-molecular-weight gas.

7. The invention according to claim 1, wherein said low-molecular-weight gas is helium.

8. The invention according to claim 2, wherein said low-molecular-weight gas is helium.

9. The invention according to claim 3, wherein said low-molecular-weight gas is helium.

10. The invention according to claim 4, wherein said low-molecular-weight gas is helium.

11. The invention according to claim 5, wherein said low-molecular-weight gas is helium.

12. The invention according to claim 6, wherein said low-molecular-weight gas is helium.

13. The invention according to claim 1, wherein said low-molecular-weight gas is hydrogen.

14. The invention according to claim 2, wherein said low-molecular-weight gas is hydrogen.

15. The invention according to claim 3, wherein said low-molecular-weight gas is hydrogen.

16. The invention according to claim 4, wherein said low-molecular-weight gas is hydrogen.

17. The invention according to claim 5, wherein said low-molecular-weight gas is hydrogen.

18. The invention according to claim 6, wherein said low-molecular-weight gas is hydrogen.

19. The invention according to claim 1, wherein said low-molecular-weight gas is additionally added as and when required into regions where defluidization is occurring locally, to assist in effecting fluidization in such regions.

20. The invention according to claim 1, comprising a step of ceasing the introduction of the low-molecular-weight gas species into the fluidizing gas when self-sustaining fluidization of said powders is achieved.

21. The invention according to claim 20, wherein the addition of the low-molecular-weight gas is recommenced when fluidization becomes poor or falls short of being self-sustaining.

22. A method of aiding fluidization in fluidizing powders, comprising using a fluidizing gas selected from the group consisting of hydrogen, deuterium, tritium and helium.

23. The invention according to claim 22, wherein said powders include fine powders comprising Geldart Group C particles.

24. The invention according to claim 22, wherein said powders consist essentially of fine particles comprising Geldart Group C particles.

25. The invention according to claim 22, where there are no fluidization aids other than said low-molecular-weight gas.

26. The invention according to claim 23, where there are no fluidization aids other than said low-molecular-weight gas.

27. The invention according to claim 24, where there are no fluidization aids other than said low-molecular-weight gas.

28. The invention according to claim 22, wherein said low-molecular-weight gas is helium.

29. The invention according to claim 23, wherein said low-molecular-weight gas is helium.

30. The invention according to claim 24, wherein said low-molecular-weight gas is helium.

31. The invention according to claim 25, wherein said low-molecular-weight gas is helium.

32. The invention according to claim 26, wherein said low-molecular-weight gas is helium.

33. The invention according to claim 27, wherein said low-molecular-weight gas is helium.

34. The invention according to claim 22, wherein said low-molecular-weight gas is hydrogen.

35. The invention according to claim 23, wherein said low-molecular-weight gas is hydrogen.

36. The invention according to claim 24, wherein said low-molecular-weight gas is hydrogen.

37. The invention according to claim 25, wherein said low-molecular-weight gas is hydrogen.

38. The invention according to claim 26, wherein said low-molecular-weight gas is hydrogen.

39. The invention according to claim 27, wherein said low-molecular-weight gas is hydrogen.

40. The invention according to claim 22, wherein said low-molecular-weight gas is additionally added as and when required into regions where defluidization is occurring locally, to act as a fluidization aid in such regions.

* * * * *